United States Patent [19]

Schmieder et al.

[11] 4,178,799

[45] Dec. 18, 1979

[54] FORCE AND BENDING MOMENT SENSING ARRANGEMENT AND STRUCTURE

[75] Inventors: Lothar Schmieder, Gilching; August Vilgertshofer, Oberpfaffenhofen; Florian Mettin, Eichenau, all of Fed. Rep. of Germany

[73] Assignee: Deutsch Forschungs- und Versuchsanstalt für Luft- und Raumfahrt e.V., Linder Höhe, Fed. Rep. of Germany

[21] Appl. No.: 916,064

[22] Filed: Jun. 16, 1978

[30] Foreign Application Priority Data

Jun. 21, 1977 [DE] Fed. Rep. of Germany ....... 2727704

[51] Int. Cl.² .............................................. G01L 1/22
[52] U.S. Cl. ................................................. 73/141 A
[58] Field of Search ................ 73/88.5 R, 100, 141 A, 73/136 R

[56] References Cited

U.S. PATENT DOCUMENTS

| | | | |
|---|---|---|---|
| 3,216,245 | 11/1965 | Seed | 73/141 A |
| 3,618,376 | 11/1971 | Shull et al. | 73/141 A X |
| 3,696,317 | 10/1972 | Farr | 73/141 A X |
| 3,968,676 | 7/1976 | Ormond | 73/141 A X |

OTHER PUBLICATIONS

Gen. Motors Engineering Journal; vol. 11, 4th quarter, 1964.

*Primary Examiner*—Anthony V. Ciarlante
*Attorney, Agent, or Firm*—Frishauf, Holtz, Goodman & Woodward

[57] ABSTRACT

To prevent friction forces from falsifying output readings obtained upon application of load between a base plate (1) and a load support plate (2), the base plate and the load support plate are rigidly connected by posts extending from one of the plates to an intermediate coupling element (3) and spokes extending from the coupling element (3) to the other one of the plates, bending deformation strain gauges being applied to the spokes and to the posts, respectively, so that forces applied in any direction will cause bending deformation of the spokes and posts, respectively, which can be evaluated with respect to the applied force.

15 Claims, 9 Drawing Figures

FORCE AND BENDING MOMENT SENSING ARRANGEMENT AND STRUCTURE

The present invention relates to a force and bending moment sensing arrangement, and more particularly to an arrangement in which forces and bending moments applied by a pressure or force application source to a load can be determined.

BACKGROUND AND PRIOR ART

It has previously been proposed to measure forces and torques which are applied by tools to a workpiece; torque wrenches are well known and used frequently, for example in automotive and other applications, in order to provide an indication to the user or operator of forces or torques which are applied during assembly or construction of various types of apparatus. Measurement of such forces or torques is necessary in many applications for proper assembly, and subsequently for supervisory quality control.

It has been found that various types of force and bending moment and torque sensing devices are subject to errors, so that the actual output received is not truly representative of the forces actually applied.

THE INVENTION

It is an object to improve force and bending moment or torque sensing arrangements which permit outputs to be received or indicated in which the components of forces or bending moments applied are not falsified or masked so that the output will be truly representative of the forces or bending moments applied.

Briefly, a rigid structure is provided which has a base plate and a load plate, the force being applied to the base plate, for example, and the load connected to the load plate. A coupling element is supported by at least three support posts projecting, preferably vertically, from the base plate and supporting the coupling element in a plane essentially parallel to the base plate and spaced therefrom. The coupling element is connected by at least three support spokes which project from the coupling element in the same plane, spaced from and parallel to the base plate towards the load plate. The spokes are rigidly secured to the coupling element and to the load plate to thereby connect the base plate and the load plate by a rigid connection system. In one form of the invention, the coupling element is ring-shaped, the spokes extending inwardly. Deformation sensing means, for example strain gauges, are associated with each of the posts and the spokes and provide output signals which are representative of bending deformation of the posts and of the spokes. These output signals can then be associated in a computer, or other calculating device, or read out directly, permitting computation of the actual forces and bending moments.

Drawings, illustrating the principle and a preferred example:

FIG. 4, collectively, shows one embodiment of the invention, and therein

Figure 4A:
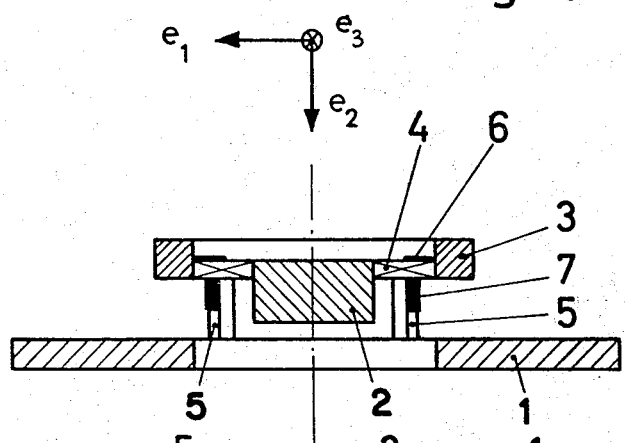

FIG. 4a is a sectional side view, and

Figure 4B:
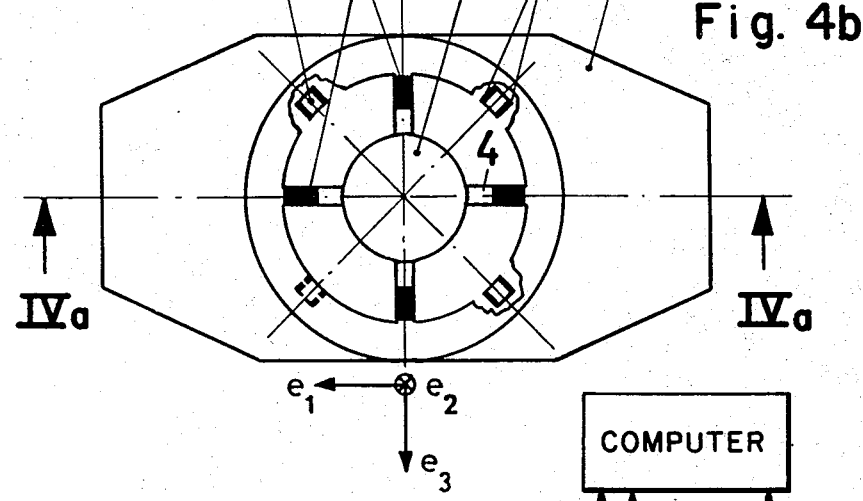
Figure 6C:
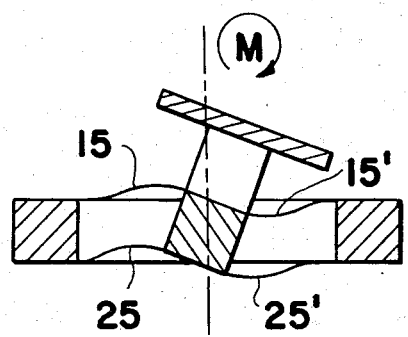

FIG. 4b is a schematic top view, partly broken away; and

FIG. 5, collectively, illustrates another embodiment in which

Figure 5A:
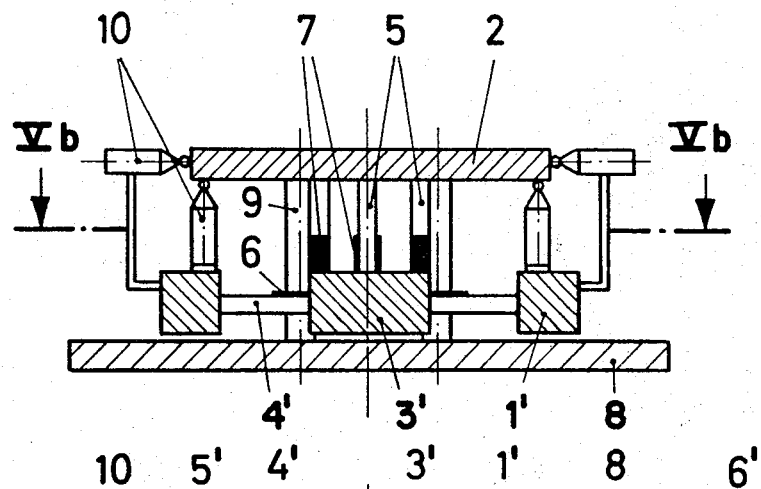

FIG. 5a is a schematic sectional side view, and

Figure 5B:
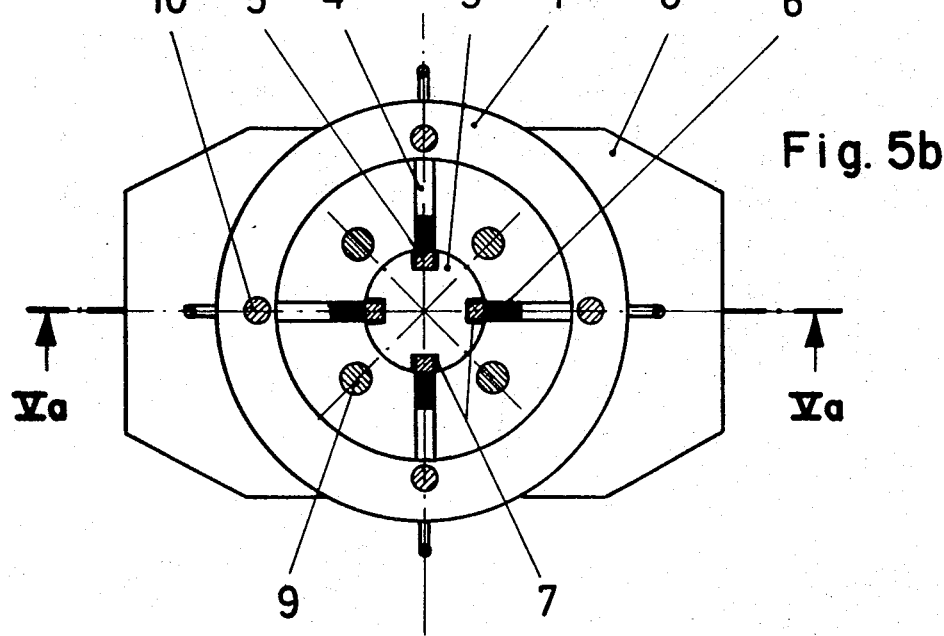
Figure 6A:
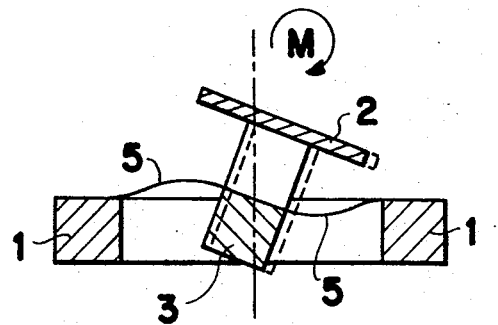
Figure 6B:
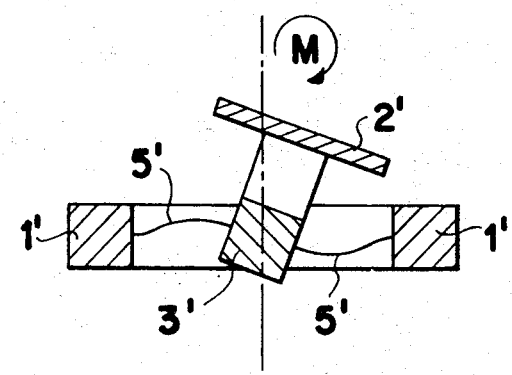

FIG. 5b is a schematic top view of the arrangement of FIG. 5a.

Figure 1:
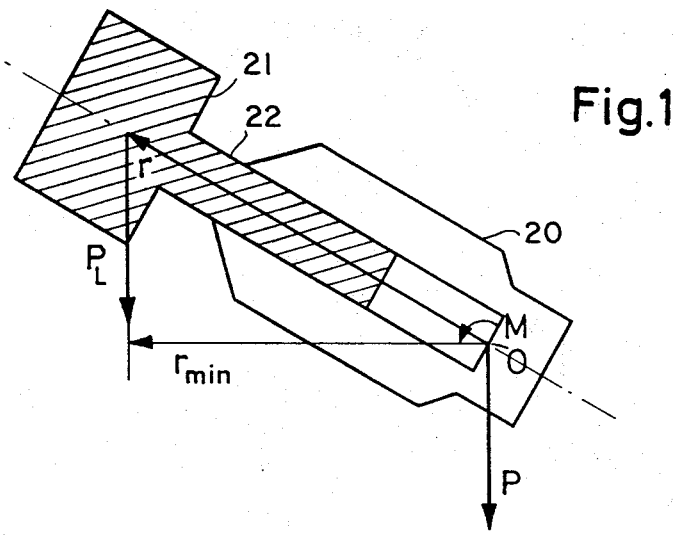
FIGS. 1 and 2 are schematic illustrations used in connection with the principle of operation.
Figure 2:
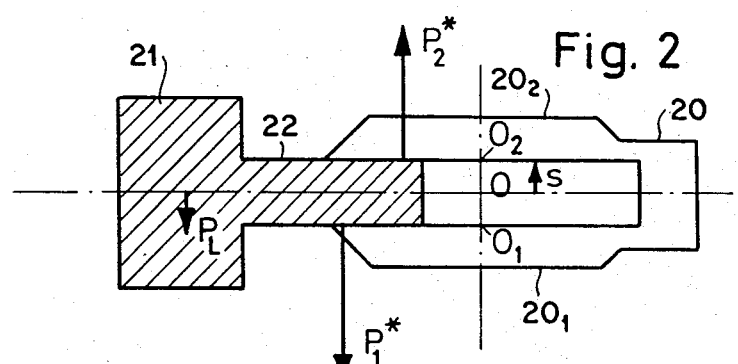
Figure 3:
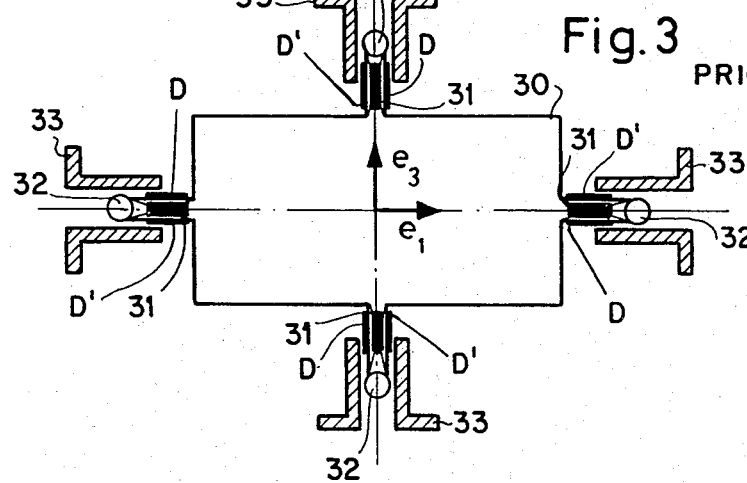
FIG. 3 shows, in a very schematic general form, the arrangement described in the prior publication German Disclosure Document DE-OS 25 29 796, and used in connection with an explanation of the arrangement of the invention.

General Principle, with reference to FIGS. 1–3: FIG. 1 shows, highly schematically, the forces which arise when a gripper, for example plier grippers, or a wrench, 20 grips a workpiece 21 by engaging a shaft 22 thereof. Let it be assumed that the jaws of the gripper 20 are to transfer forces to the workpiece 21; these forces are, preferably, applied pneumatically or hydraulically, so that they can be easily controlled and measured. If the forces and moments applied at point O are measured, then a process control computer which is connected to the gripper 20 can determine not only the weight $P_L$ of the load, but also the load vector radius, or load arm $r_{min}$, by measuring the applied torque M, based on the relationship:

$$r_{min} = \frac{P \times M}{P^2} \qquad (1)$$

wherein r, P and M are vectorial forces. The point of application of a force along its line of application can be shifted at random. Thus, calculation of the true lever arm r is not possible. Pure loading torques may also arise, for example upon twisting a screw into a tapped hole. These can be measured unambiguously only if the line of application of the force goes through the reference point, so that the loading torque due to the weight of the load becomes zero.

FIG. 2 shows a construction in which each one of the gripper arms $20_1$ and $20_2$ of the gripper 20 has a measuring device attached thereto. For a point O which is halfway between the points $O_1$ and $O_2$, the weight $P_L$ and the radius $r_{min}$ can be unambiguously determined if the width of the opening of the gripper 20, defined as 2s, is known from the following relationship:

$$P_L = P_1 + P_2 \qquad (2)$$

$$M_L = P_L \times r_{min} = (P_2 - P_1) \times s + M_1 + M_2 \qquad (3)$$

in which, again, $P_1$, $M_1$, $P_2$, and $M_2$ are referred to the points $O_1$, $O_2$, and s is a vector. The torques $m_1$ and $m_2$ are not shown, as such, in FIG. 2. Equation (1) can be applied to each one of the fingers $20_1$ and $20_2$ of FIG. 2; thus, the points of application of the resultant forces $P_1^*$, $P_2^*$ are known. The second component, $P_2^* - P_1^*$, divided by two, that is, $(P_2^* - P_1^*)/2$, determines the force applied by the gripper. It is thus possible to control a gripper, pliers, wrench, or the like, in accordance with FIG. 2 with an electric motor by means of a servo system by continuously sensing the pressure of application and deriving sensing signals which are used for correction of the force applied by the electric motor, that is, its torque being applied to the gripper 20. The width of opening, that is, the dimension s, of course is known. Thus, the application of forces to workpieces 21 can be determined. It is also possible to determine the sliding friction of the workpiece as it is being rotated, or the transition from stopped condition of the workpiece to sliding movement, for example rotary sliding of a nut on a thread, since the transitional frictional force or break-away torque will exhibit a sudden jump, that is, an abrupt decrease in torque as the workpiece begins to move. The tangential forces thus drop suddenly.

Both applied forces as well as torques, or moment-forces, can be determined by applying strain gauges, or other displacement elements to a rigid body. It is, however, difficult to unambiguously determine the forces which do cause the deformations or strains measured by the strain gauges. The referenced literature, Report E-2754 of the Massachussetts Institute of Technology, describes an arrangement in which a plate 30 (FIG. 3) is supported on four beams 31, each of which has two strain gauges D, D' applied thereto, and connected in the well-known bridge configuration. The strain gauges measure bending forces in two respectively perpendicular directions. The beams 31 terminate in balls 32 which are held in four sleeves 33, permitting movement of the balls within the sleeves. A force which is perpendicularly applied results in bending of the four beams, sensed by the strips D'; the strips D', connected to bridge circuits, thus provide output signals which can be applied to a computation network. The perpendicular force and any rotary forces which arise if the perpendicular force is not exactly central can thus be measured. The rotary forces will cause strains about the axes $e_1$ and $e_3$ (FIG. 3). A tangential force, perpendicular thereto, provides bending of only two beams, permitting the remaining two beams to shift, without being loaded.

If tangential forces and vertical forces occur simultaneously, then the vertical force will tend to press the balls against the sleeves and cause friction therein which partly compensates the outer tangential forces which, then, will not be sensed and, for purposes of the sensing arrangement, will be lost. Frictional forces which falsify measuring results and output signals also occur upon deformation of the arrangement, for example due to even momentary overloading, so that the four balls 32 and their holding sleeves 33 will no longer be rigidly and strictly positioned in one plane.

An improved sensor is described in German Disclosure Document DE-OS 25 29 796 in which a hub is supported on four free-standing arms, hooked into a housing. The arms have ballshaped ends to permit shifting in the direction of the longitudinal axes of the arms. An improvement with respect to the arrangement of FIG. 2 is thereby obtained, in that deformation or positioning transducers are used for the measurement which determine the shift of a crossed element, such as a spoke center, and of a flange. The error which is introduced by frictional forces arising upon application of forces is not, however, eliminated.

Description of an embodiment in accordance with the invention, with reference to FIG. 4:

A base plate 1 and a load or support plate 2 are located parallel to each other. A coupling element 3, formed as a ring, is supported by four posts 5 secured to the base plate and to the ring to provide a rigid assembly. The ring 3 supports the load support plate 2 by means of four spokes 4 which are located in the plane of the load support plate 2, and are rigidly connected thereto. The posts 5 preferably are offset with respect to the spokes 4 by 45° (see FIG. 4b). The upper and lower sides of the spokes 4 and the lateral sides of the posts 5 have strain gauge strips 6, 7, respectively, secured thereto to measure the deformation upon loading. The deformation is, typically, a bending deformation. Instead of bending, the vertical shift of at least three points of the load plate 2 with respect to the plane of the ring 3, and the horizontal shift of at least three points on the load plate 2 or of the ring 3 with respect to the base plate 1 could also be determined by means of position transducers, as described in the aforementioned German Disclosure Publication 25 29 976. The load support plate 2, as shown, is circular; ring 3 is a circular ring. It is not necessary that the load plate 2 and the ring 3 be circular; other shapes, for example square or rectangular, may be used. Rather than using four spokes and four supports, it is possible to use other numbers of supports and spokes, but at least three spokes should be provided; also, at least three supports should be provided. The arrangement using three support posts 5 and three spokes 4 is particularly suitable if the base plate 1, load support plate 2, and ring 3 are all circular.

The width and the thickness of the ring-shaped coupling element 3 are preferably at least twice as large as the corresponding dimensions of the spokes and the support posts, so that almost the entire deformation energy will be concentrated in the posts and the spokes, the deformation of which is to be measured.

Operation: A force which is directed vertically downwardly in the direction $e_2$ bends the spokes 4, whereas the posts 5 are loaded only under compression due to the substantial stiffness of the ring 3. Thus, the strain gauges 7 on the posts 5 will not record a force. A tangential force in the direction $e_1$ and/or $e_3$ however, places a loading on two spokes 4 which is compressive and stresses the other two in elongation which, however, is not recorded by the bending recording strain gauges. All four posts 5, however, are bent, which can readily be measured on two of these posts at least. Experiments have shown that interference signals due to coupling between the forces are less than 3%. Any remaining deformation due to overloading will merely cause a shift in the zero or reference point of the strain gauges which normally automatically compensated when strain gauge signals are evaluated and fed to computation apparatus.

The strain gauges are so arranged that they only measure bending stresses. Thus, these bending stress deformation gauges provide high accuracy of measurement because any other deformation due to compression, elongation, or displacement, which provide interfering signals, are smaller by one order of magnitude. To provide accurate measurement outputs, it is necessary, however, that the spokes are all in one plane. If two parallel spoke assemblies are used in which the spokes, for example, cross each other as described, for example, in the General Motors Engineering Journal publication, it is necessary to record elongation as well as compression in order to obtain unambiguous measurements and to sacrifice therefor measurement of bending stresses. FIG. 4 and FIG. 5 of the General Motors Engineering Journal publication are offset by 90°. The steer moment shown in FIG. 5 is essentially compensated by the elongation and compression of the spokes in the upper and lower plane, respectively. Bending is only generated in this case if buckling of the spokes appears. This decreases the accuracy of measurement by a factor of about 10; alternatively, upon measurement of bending moments about the $e_1$ or $e_3$ axis (FIG. 4b), substantial errors of the bending moments must be accepted, since these moments are accepted to a large extent by the tension and compression forces acting on, and in the spokes.

The difference between deformation due to pressure with respect to that due to bending, as obtained in accordance with the invention, can be explained as follows:

Example: A rod having a thickness h=3 mm and a length l=15 mm is clamped at both ends. The material of the rod has a modulus of elasticity E.
Upon application of a longitudinal force P, tending to elongate the rod, the elongation will be:

$$D_1 = \frac{P}{Eh^2} \quad (4)$$

Upon loading by a bending force P', the elongation will be:

$$D_2 = \frac{hPl}{4Eh^4/12} \quad (5)$$

Dividing the two expressions results in the ratio:

$$\frac{D_2}{D_1} = \frac{3 \; l}{h} = 15 \quad (6)$$

If the arrangement of crossed spokes at a distance L is considered, in which a force is applied outside of the crossed spokes at a distance of l, then the corresponding elongations can be computed by inserting the applied force in equation (4) above. If only a single arrangement of crossed spokes is provided, then the above equation (5) will govern. Analogous to equation (6) above, the following will be obtained:

$$\frac{D_2}{D_1} = \frac{3L}{h} \quad (7)$$

Embodiment of FIG. 5: A ring-shaped base plate 1' is connected to the load support plate 2' by means of a massive central coupling block 3'. The connecting elements are spokes 4' extending parallel to the plane of the support plate 2' and support posts 5', perpendicularly thereto. The posts have bending strain gauges 7' applied to the longitudinal sides which measure tangential forces and torques which are applied perpendicularly to the plane of the base plate. A limit work plate 8 which is secured to the load support plate 2' by means of bolts 9 limits vertical deflection by engagement with the base plate 1'. The spokes 4' have bending sensing transducer gauges 6' applied thereto.

A rigid connection can be obtained by manufacturing the arrangement of elements 1-2-3 of a single workpiece, for example by turning or milling. The rigid connection can be obtained by other methods as well, for example by brazing, welding, or the like, which is particularly suitable when large systems are to be made. Adhesives may also be used.

Rather than using bending or elongation strain gauges 6', 7', displacement transducers 10 can be used which sense the relative shift between the base plate 1 and the work support plate 2. These transducers 10 measure the shift in two respectively perpendicular directions, as illustrated in FIG. 5.

The signals themselves can be evaluated by application to a computer (FIG. 4), to which the strain gauges are connected, for example over suitable amplification circuits, the strain gauge signals being applied in analog or digital form, after processing, for example, in bridge circuits and, in accordance with desired operation of the calculating system, for example after conversion into digital form in an analog/digital converter, as well known in the signal evaluation field.

Various changes and modifications may be made within the scope of the inventive concept.

We claim:
1. Force and bending moment sensing arrangement having a base plate (1) and a load support plate (2) to determine loading and bending stresses applied between the base plate and the load support plate, and further comprising:
   a coupling element (3);
   at least three parallel support posts (5) of equal length connected to and positioned between one of said plates and the coupling element (3) and supporting the coupling element spaced from said one plate, said posts being both rigidly secured to said one plate and to the coupling element;
   at least three support spokes (4) rigidly secured to said coupling element (3) and to said other plate and running therebetween with the spoke axes lying substantially in a single plane,
   whereby said base plate (1) and said load support plate (2) are held together by a rigid post-coupling element-spoke connection system;
   and bending deformation sensing means (6, 7) associated with each of said posts (5) and said spokes (4) and providing output signals representative of bending deformation of said respective posts and spokes.

2. Arrangement according to claim 1, wherein the coupling element (3) is ring-shaped.

3. Arrangement according to claim 1, wherein the deformation sensing means (6, 7) comprises strain gauges.

4. Arrangement according to claim 3, wherein the coupling element is ring-shaped, and has a radial width and an axial thickness which are at least twice as great, respectively, as the width and thickness of the posts (5) and of the spokes (4).

5. Arrangement according to claim 3, further comprising evaluation means connected to said strain gauges (6, 7) and evaluating the signals derived therefrom.

6. Arrangement according to claim 3, wherein the cross-sectional area of the spokes (4) and the posts (5), respectively, is less than one-quarter of the cross-sectional area of the coupling element (3) in order to concentrate forces transmitted through the post-coupling element-spoke connection system between the base plate (1) and the load support plate (2) in said spokes (4) and said posts (5), respectively.

7. Arrangement according to claim 3, wherein (FIG. 4) the coupling element (3) is ring-shaped, and one of said plates (2) is located concentrically within the ring formed by the coupling element (3).

8. Arrangement according to claim 3, wherein (FIG. 5) at least one of said plates (1) is a ring-shaped plate, and said coupling element (3) is a block located within said ring-shaped plate and connected thereto by said spokes (4') and to the other of said plates (2) by said posts (5').

9. Arrangement according to claim 1, wherein the base plate (1), the load support plate (2), the coupling element (3), said posts (5) and said spokes (4) comprise a single unitary metal element.

10. Arrangement according to claim 1, wherein the posts (5) and the spokes (4) are connected, respectively, to said plates and to the coupling element by rigid metal connection.

11. Arrangement according to claim 10, wherein the rigid metal connection is a brazed joint.

12. Arrangement according to claim 10, wherein the rigid metal connection is a welded joint.

13. Arrangement according to claim 10, wherein the rigid metal connection comprises an adhesive joint.

14. Arrangement according to claim 1, wherein the deformation sensing means (6) which are located on the spokes are applied to the surfaces of the spokes which are parallel to the plane of the base plate (1); the posts (5) are located along the periphery of an imaginary circle, and the deformation sensing means (7) secured to the posts are located at the surfaces which are perpendicular to the periphery of said imaginary circle.

15. Arrangement according to claim 1 wherein said posts (5) are perpendicular, when unstressed by bending stresses, to said plane of said spokes.

* * * * *